US012221770B2

(12) United States Patent
Inderelst et al.

(10) Patent No.: US 12,221,770 B2
(45) Date of Patent: Feb. 11, 2025

(54) CONSTRUCTION MACHINE WITH A HYDRAULIC SYSTEM

(71) Applicant: XCMG European Research Center GmbH, Krefeld (DE)

(72) Inventors: Martin Inderelst, Duisburg (DE); Stefan Pollmeier, Cologne (DE)

(73) Assignee: XCMG European Research Center GmbH, Krefeld (DE)

(*) Notice: Subject to any disclaimer, the term of this patent is extended or adjusted under 35 U.S.C. 154(b) by 0 days.

(21) Appl. No.: 18/242,108

(22) Filed: Sep. 5, 2023

(65) Prior Publication Data

US 2024/0084555 A1 Mar. 14, 2024

(30) Foreign Application Priority Data

Sep. 8, 2022 (EP) .................................... 22194607

(51) Int. Cl.
*E02F 9/22* (2006.01)
*F15B 11/16* (2006.01)
*E02F 3/42* (2006.01)

(52) U.S. Cl.
CPC .......... *E02F 9/2285* (2013.01); *E02F 9/2228* (2013.01); *E02F 9/2235* (2013.01); *E02F 9/2242* (2013.01); *E02F 9/2296* (2013.01); *F15B 11/162* (2013.01); *E02F 3/42* (2013.01); *F15B 2211/20584* (2013.01); *F15B 2211/20592* (2013.01)

(58) Field of Classification Search
CPC .................... F15B 11/162; F15B 11/17; F15B 2211/20584; F15B 2211/20592; F15B 2211/781; E02F 3/434; E02F 9/2228; E02F 9/2235; E02F 9/2239; E02F 9/2242
See application file for complete search history.

(56) References Cited

U.S. PATENT DOCUMENTS 5,806,312 A * 9/1998 Kauss .................. F15B 11/163
60/426
9,200,646 B2 * 12/2015 Weickert .............. E02F 9/2228
(Continued)

FOREIGN PATENT DOCUMENTS

EP 0419673 A1 4/1991

*Primary Examiner* — Michael Leslie
(74) *Attorney, Agent, or Firm* — CALDERON SAFRAN & WRIGHT P.C.

(57) ABSTRACT

A construction machine with a hydraulic system has a hydraulic control, which comprises a joystick, a hydraulic pressure source, and two hydraulic drives. Main control valves are controlled by a joystick. The construction machine comprises multiple components, and a hydraulic drive is assigned for moving these components.
The hydraulic control comprises an electrically-actuatable priority proportional valve in the hydraulic connection of a drive. The priority valve is electrically connected to the electronic control unit and generates additional hydraulic resistance. The hydraulic control comprises sensors, on the components, for detection of the positions thereof. The detected sensor values are transferred to the control unit. At least one trajectory is stored in the control unit. A control mode can be activated, in which each priority valve is controlled using the current sensor values upon actuation of the joystick so that the stored trajectory is run by control of the drives.

19 Claims, 4 Drawing Sheets

(56) References Cited

U.S. PATENT DOCUMENTS

| | | | | |
|---|---|---|---|---|
| 10,161,423 | B2 * | 12/2018 | Rampen | F15B 11/162 |
| 10,822,769 | B2 * | 11/2020 | Shimano | E02F 9/2203 |
| 10,968,604 | B2 * | 4/2021 | Imura | E02F 9/2271 |
| 11,268,545 | B2 * | 3/2022 | Szeles | F15B 11/162 |
| 11,293,460 | B2 * | 4/2022 | Quan | F15B 13/0417 |
| 11,434,936 | B2 * | 9/2022 | Ziemens | F15B 11/163 |
| 11,619,030 | B2 * | 4/2023 | Misaki | E02F 9/2228<br>701/50 |
| 2013/0291530 | A1 * | 11/2013 | Bang | E02F 9/2292<br>60/428 |
| 2021/0131074 | A1 | 5/2021 | Hashimoto | |
| 2022/0010523 | A1 | 1/2022 | Izumikawa | |

* cited by examiner

CONSTRUCTION MACHINE WITH A HYDRAULIC SYSTEM

CROSS-REFERENCE TO RELATED APPLICATIONS AND CLAIM TO PRIORITY

This application is related to application number 22194607.2, filed Sep. 8, 2022, in the European Patent Office, the disclosure of which is incorporated herein by reference and to which priority is claimed.

FILED OF THE INVENTION

The invention relates to a construction machine with a hydraulic system with at least one hydraulic control, which comprises at least one joystick, at least one hydraulic pressure source, and two hydraulic drives, wherein the pressure level of each hydraulic drive can be different depending on the working point of the drive selected in each case, wherein each hydraulic drive is connected to each pressure source by means of one hydraulic connection each, in which in each case a main control valve is provided, which can be controlled by the one joystick or at least one of the joysticks, wherein the construction machine comprises multiple components that can move at least relative to one another, to which in each case a hydraulic drive for moving these components is assigned.

Such construction machines are known from experience in various implementations. In this case, it is disadvantageous that when such construction machines are in actual use, recurring working processes also occur that are difficult to reproduce with precision under manual control, so that deviations from the desired working processes are unavoidable and can lead to a poor or even unsatisfactory working result.

SUMMARY OF THE INVENTION

The object of the invention is to avoid the above-mentioned drawbacks and to indicate an improved construction machine, with which an improved option for implementing working processes, in particular recurring working processes, is provided.

This object is achieved in the case of a generic construction machine, in that at least one hydraulic control comprises at least one priority valve that is designed to be electrically actuatable and that is designed as a proportional valve, which priority valve is assigned to a drive and is provided in its hydraulic connection, wherein each priority valve is electrically connected to the electronic control unit and can be controlled to generate additional hydraulic resistance, wherein the hydraulic control additionally comprises sensors that are provided on the movable components for indirect or direct detection of the respective positions thereof, which are in each case connected to the latter in order to transfer the detected sensor values to the control unit, wherein in addition, in the control unit, on the one hand, at least one trajectory can be stored, and, on the other hand, a control mode can be activated, in which each priority valve can be controlled using the values actually detected in each case by the sensors upon actuation of the at least one joystick by the control unit in such a way that the stored trajectory is run by corresponding control of the drives.

Thus, when activating the control mode, at least one priority valve is actuated depending on the requirement for achieving the stored trajectory, so that either the hydraulic drive with the higher load is prioritized over the hydraulic drive with the lower load, or conversely, the hydraulic drive with the smaller load is prioritized over the hydraulic drive with the higher load. Consequently, the drive with the lower load is loaded with more resistance, so that it is in effect actuated less than it is actually preset by the operator of the construction machine by his actuation of the joystick.

Thus, it is possible to control the speed and position of the hydraulic drive by the priority valve(s), since in this way, in each case the respective hydraulic resistance in a hydraulic connection is changed and thus the hydraulic flow to the respective drive is altered with respect to the specification of the joystick. Thus, in the case of an activated control mode with any actuation of the joystick, the trajectory stored in the control unit can be automatically travelled as long as the joystick continues to be actuated.

Preferably, at least two hydraulic pressure sources can be provided, wherein each hydraulic drive is connected to each pressure source by means of one hydraulic connection each, and at least two hydraulic pressure sources have different pressure levels.

According to the invention, in the case of at least one hydraulic control, the priority valve in the corresponding hydraulic connection or the priority valves in the corresponding hydraulic connections can in each case be arranged between the corresponding hydraulic pressure source and the associated main control valve, so that the respective priority valve, viewed from the pressure source, is provided in front of the corresponding main control valve.

The main control valves are provided in each case in the connection of a single pressure source with a single hydraulic drive. In this case, first a branch can be provided to each pressure source, starting from which two separate connections within each case a main control valve can then lead to the two hydraulic drives. The priority valve or the priority valves is/are in this case preferably provided in each case between the branch and the corresponding respective main control valve.

When two priority valves are provided, in each case one of the two separate connections can then be equipped with a priority valve from each pressure source behind the branch and can lead to a drive, whereas the other one of the two separate connections is not equipped with a priority valve and leads to the other drive. In this case, the two separate connections of the two pressure sources, which in each case are equipped with a priority valve, can either lead to the same drive or else in each case can lead to different drives.

Advantageously, in the case of at least one hydraulic control, on the one hand, at least one main control valve can be designed as a hydraulically-controlled main control valve, preferably every main control valve can be designed as a hydraulically-controlled main control valve, and, on the other hand, the corresponding joystick provided for the hydraulic control can be designed as an at least partially hydraulic joystick, preferably as a fully hydraulic joystick, with which at least one of the existing hydraulically-controlled main control valves, preferably every hydraulically-controlled main control valve, can be controlled. Thus, control of the main control valves relative to a hydraulic circuit can also be exercised with an electric joystick and electrically-actuated main control valves even when the electrical components fail.

Preferably, in the case of at least one hydraulic control, at least one electrical movement sensor can be assigned to each hydraulic drive for detecting movements of the relevant hydraulic drive, so that in real time, a corresponding control and also regulation of the priority valves corresponding to the respective movement of the relevant hydraulic drive that can also be dependent upon external circumstances, such as, e.g., load, resistances, etc., is possible.

In this respect, in the case of at least one hydraulic control, at least one electrical movement sensor can also be assigned to each hydraulic drive for detecting movements of the relevant component that can be moved by the respective hydraulic drive.

Alternatively or additionally, in the case of at least one hydraulic control, at least one sensor can also be designed for detecting the position of a movable component of the construction machine for the indirect or direct detection of the absolute position in space.

In addition, in the case of at least one hydraulic control, at least one sensor for detecting the position of a movable component of the construction machine can be designed for the detection of the relative position of this component relative to the construction machine and/or another component of the construction machine.

Also, in the case of at least one hydraulic control, in each case a pressure sensor connected to the control unit can be assigned to at least one hydraulic drive, preferably every hydraulic drive, which pressure sensor detects the hydraulic pressure acting on this hydraulic drive and passes it on to the control unit.

In the case of a preferred embodiment of the invention, in the case of at least one hydraulic control, at least one main control valve can be designed as an electrically-controlled main control valve, preferably every main control valve can be designed in each case as an electrically-controlled main control valve, wherein at least one joystick is designed as an at least partially electric, preferably as a fully electric, joystick, for controlling at least one, preferably every, existing electrically-controlled main control valve.

Advantageously, in the case of at least one hydraulic connection, the latter can be formed in the partial area behind the main control valve by two partial connections in order thus to be able to produce different movement directions of the drive.

According to the invention, the construction machine can be designed as a hydraulic excavator and can comprise an undercarriage, a rotating superstructure arranged thereon, and an extension arm arranged to be able to pivot on the superstructure.

In this case, the extension arm can be designed as an articulated arm with a first arm segment arranged to be able to pivot on the superstructure and with a second arm segment arranged to be able to pivot on the first arm segment, wherein a bucket can be arranged to be able to pivot on the second arm segment.

Advantageously, the construction machine can be designed so that in the case of at least one hydraulic control, the two drives can produce maximum forces of different levels, and the hydraulic drive with the higher maximum force is assigned to the first arm segment for its pivoting, wherein the hydraulic drive with the lower maximum force is assigned to the second arm segment for its pivoting relative to the first arm segment.

Preferably, in the case of at least one hydraulic control, at least one hydraulic drive can be designed as at least one hydraulic cylinder, preferably as multiple hydraulic cylinders provided in parallel; preferably every hydraulic drive can be designed in each case as at least one hydraulic cylinder, preferably as multiple hydraulic cylinders provided in parallel.

Furthermore, in the case of at least one hydraulic control, the control mode can be activated at least manually.

In addition, in the case of at least one hydraulic control, sensor values, for example in the form of a sensor value combination and/or a sensor value sequence, can be stored in the control unit, in which the control mode is to be activated, and an algorithm for evaluating the sensor values currently detected by the sensors, and, in the event that they accordingly match the sensor values stored in the control unit, and/or sensor value combination(s) and/or sensor value sequence(s), automatic activation of the control mode can be integrated into the control unit.

According to the invention, in the case of at least one hydraulic control, an automatic mode can be activated in the control unit, in which automatic mode the algorithm for automatic activation of the control mode is active.

BRIEF DESCRIPTION OF THE DRAWINGS

Below, embodiments of the invention depicted in the drawings are explained. Here.

In all figures, identical reference symbols are used for the same or similar components.

DETAILED DESCRIPTION OF THE PREFERRED EMBODIMENT(S)

Figure 1:
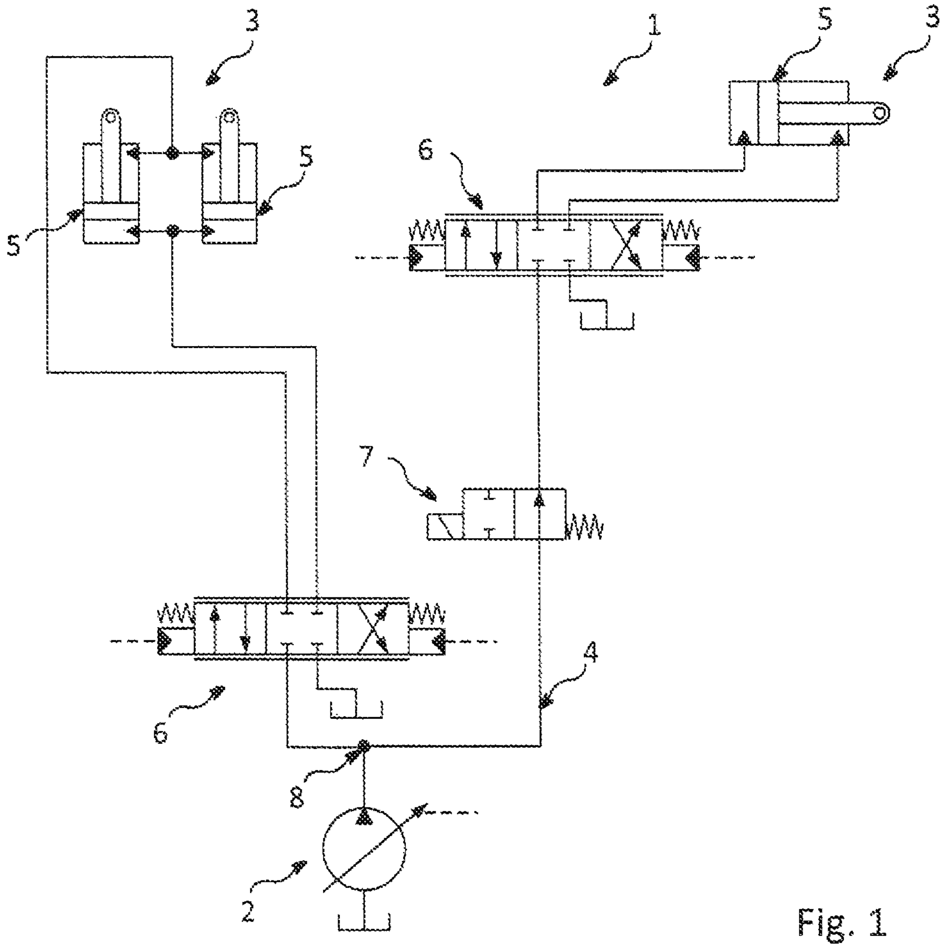
FIG. 1 shows a first embodiment of a hydraulic control of a construction machine according to the invention.
Figure 4:
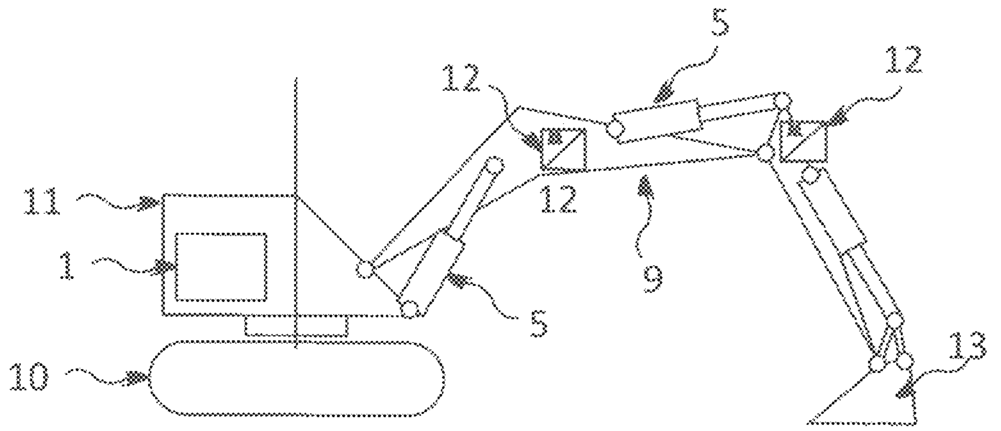
FIG. 4 shows a construction machine having the hydraulic control of the present invention.

FIG. 1 relates to a construction machine 100, such as a hydraulic excavator best shown in FIG. 4 with a hydraulic system with a hydraulic control 1, which comprises a joystick 15, a hydraulic pressure source 2, and two hydraulic drives 3, which are provided for moving at least components of the construction machine 100 that can move relative to one another and in this respect are assigned in each case to such a component.

The construction machine 100 further comprises an undercarriage 10, a rotating superstructure 11 arranged thereon, and an extension arm 9 arranged to be able to pivot on the superstructure 11, as best shown in FIG. 4. In this case, the extension arm is designed as an articulated arm 9 with a first arm segment 91 arranged to be able to pivot on the superstructure 11 and with a second arm segment 92 arranged to be able to pivot on the first arm segment 91, wherein a bucket 13 can be arranged to be able to pivot on the second arm segment 92.

Each hydraulic drive 3 is connected to the pressure source 2 by means of one hydraulic connection 4 each. In each of these hydraulic connections 4, in each case a main control valve 6 is provided, which can be controlled by the joystick. The hydraulic drives 3 shown are designed either as an individual hydraulic cylinder 5 or as two hydraulic cylinders 5 that are provided in parallel.

In addition, a priority valve 7 is comprised that can be actuated electrically and that is designed as a proportional valve. The priority valve 7 is assigned to one of the two drives 3 and is provided in its hydraulic connection 4, namely in each case between the hydraulic pressure source 2 and the associated main control valve 6, so that the priority valve 7, viewed from the pressure source 2, is provided in front of the corresponding main control valve 6. In the example shown in FIG. 1, the priority valve 7 is assigned to the drive 3 that is designed as an individual hydraulic cylinder 5.

The main control valves 6 are in each case provided in the connection 4 of the pressure source 2 with a single hydraulic drive 3. If—as shown in FIG. 1—first a branch 8 is provided in the case of the pressure source 2, two separate connections 4 with in each case a main control valve 6 then drain to one each of the two hydraulic drives 3. The priority valve 7 is in this case provided between the branch 8 and the corresponding main control valve 6.

In the hydraulic control 1 shown, all main control valves 6 are designed in each case as hydraulically-controlled main control valves 6, which can be controlled by the joystick designed as an at least partially hydraulic joystick, preferably fully hydraulic joystick. Thus, the control of the main control valves 6 is also possible in addition when the electrical components fail.

The priority valves 7 are in each case electrically connected to an electronic control unit 14, and they can be controlled by this control unit 14 to generate additional hydraulic resistance.

Figure 3:
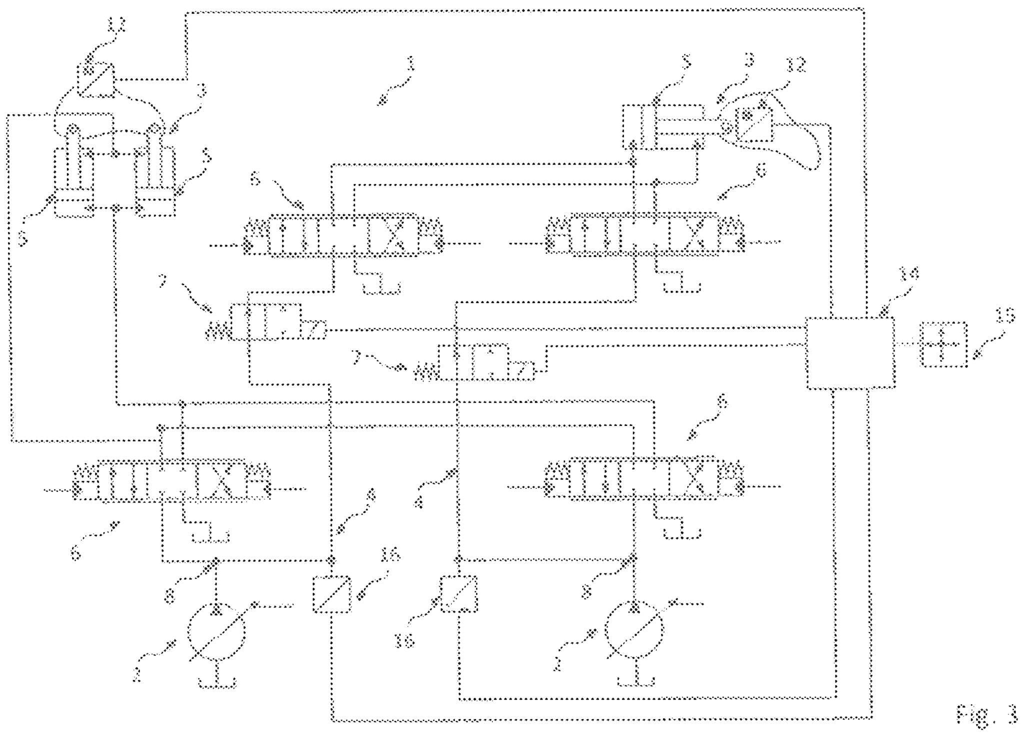
FIG. 3 shows a third embodiment of a hydraulic control of a construction machine according to the invention.

In addition, the hydraulic control 1 comprises electrical movement sensors 12 provided on the movable components 91 and 92, as shown in FIGS. 3 and 4, for indirect or direct detection of their respective position, which, to transfer the detected sensor values to the electronic control unit 14, are in each case connected to the latter. In the electronic control unit 14, on the one hand, at least one trajectory can be stored and, on the other hand, a control mode can be activated, in which the priority valve 7 can be controlled using the values currently detected in each case by the electrical movement sensors 12 when the joystick 15 is actuated by the electronic control unit 14, in such a way that the stored trajectory is run by corresponding control of the drives 3.

Thus, in the case of the activation of the control mode, the priority valve 7 is actuated depending on the requirement for reaching the stored trajectory, so that either the hydraulic drive 3 with the higher load is prioritized over the hydraulic drive 3 with the lower load, or conversely, the hydraulic drive 3 with the lower load is prioritized over the hydraulic drive 3 with the higher load. Consequently, the drive 3 with the lower load is loaded with more resistance, so that it is in effect actuated less than it is actually preset by the operator of the construction machine by his actuation of the joystick.

Thus, it is possible to control the speed and position of the hydraulic drive 3 by the priority valve 7, since the latter changes the hydraulic resistance in the hydraulic connections 4 and thus the hydraulic flow to the respective drive 3 is altered with respect to the specification of the joystick. Thus, in the case of an activated control mode with any actuation of the joystick, the trajectory stored in the control unit can be automatically travelled as long as the joystick continues to be actuated.

Also, in the case of at least one hydraulic control, in each case a pressure sensor 16, shown in FIG. 3, connected to the electronic control unit 14 can be assigned to at least one hydraulic drive 3, preferably every hydraulic drive 3, which pressure sensor 16 detects the hydraulic pressure acting on this hydraulic drive 3 and passes it on to the electronic control unit 14.

Figure 2:
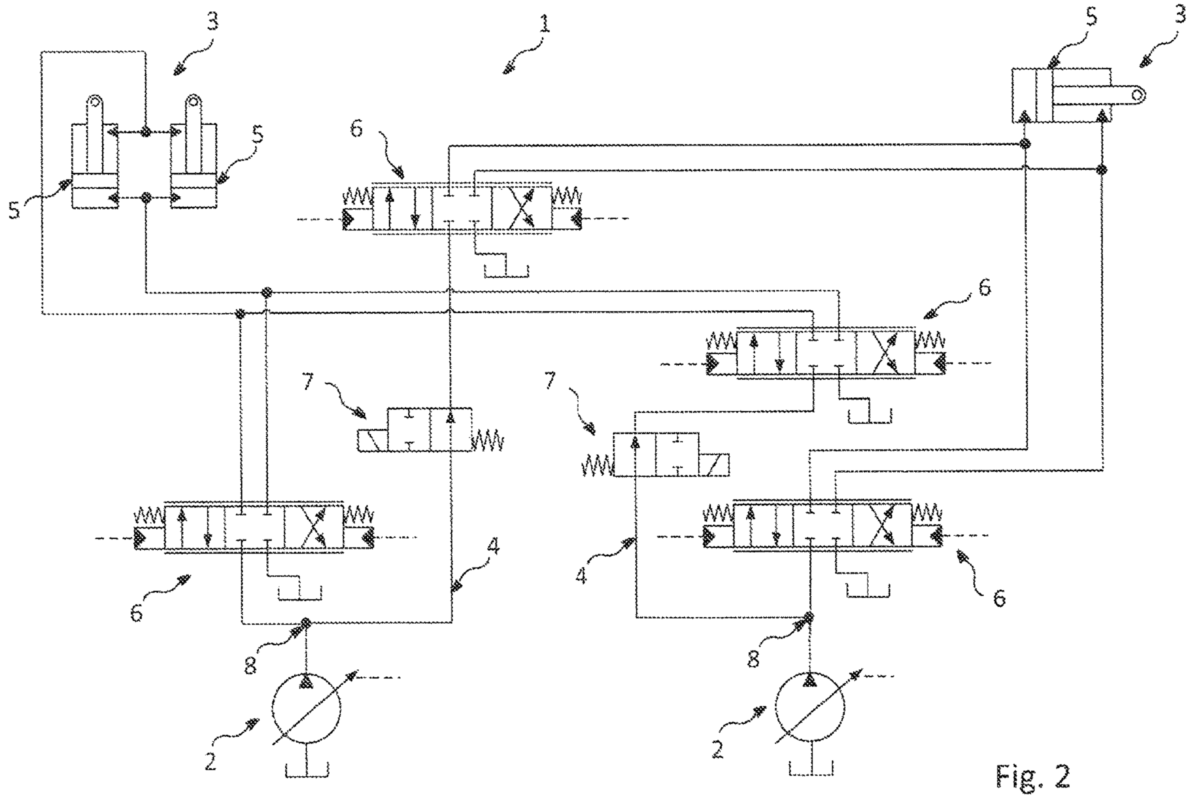
FIG. 2 shows a second embodiment of a hydraulic control of a construction machine according to the invention.

In FIG. 2, a second embodiment of the invention is shown. There, deviating from the object shown in FIG. 1, two hydraulic pressure sources 2 with different pressure levels are provided. Each hydraulic drive 3 is connected to two pressure sources 2 by means of one hydraulic connection 4 each, in which in each case a main control valve 6 that can be controlled by the joystick is provided.

Also, in the case of this embodiment, two priority valves 7 that can be actuated electrically and that are designed as proportional valves are comprised, which both are assigned to one of the two drives 3 and in which both hydraulic connections 4 are provided. The two priority valves 7 are in each case arranged between the corresponding hydraulic pressure source 2 and the associated main control valve 6, so that the respective priority valve 7, viewed from the pressure source 2, is provided in front of the corresponding main control valve 6, specifically between the branch 8 and the corresponding respective main control valve 6. In this case, first a branch 8 is provided to each pressure source 2, starting from which in each case two separate connections 4 with in each case a main control valve 6 then lead to one each of the two hydraulic drives 3.

The priority valves 7 are in each case electrically connected to an electronic control unit, not depicted in the drawing, and they can be controlled by this control unit to generate additional hydraulic resistance.

However, in the embodiment shown in FIG. 3, namely also two hydraulic pressure sources 2 with different pressure levels as well as two priority valves 7 that are designed to be electrically actuatable and that are designed as proportional valves are comprised. As an alternative to the object shown in FIG. 3, the two priority valves 7 are assigned, however, to a single one of the two drives 3 and are provided in its two hydraulic connections 4.

In this case, they are arranged in each case between the corresponding hydraulic pressure source 2 and the associated main control valve 6, so that the respective priority valve 7 viewed from the pressure source 2 is provided in front of the corresponding main control valve 6. In the example shown in FIG. 3, the two priority valves 7 are assigned to the drive 3 that is designed as an individual hydraulic cylinder 5.

The main control valves 6 are in each case provided in the connection 4 of a single pressure source 2 with a single hydraulic drive 3. If—as shown in FIG. 3—each pressure source 2 is first provided with a branch 8, then in each case, two separate connections 4 with in each case a main control valve 6 drain to one each of the two hydraulic drives 3.

The priority valves 7 are in this case provided in each case between the branch 8 and the corresponding respective main control valve 6.

In the case of the hydraulic control 1 shown, all main control valves 6 in each case are designed as a hydraulically-controlled main control valve 6, which can be controlled by the at least partially hydraulic joystick, preferably fully hydraulic joystick. Thus, control of the main control valves is also possible in addition even when the electrical components fail.

The priority valves 7 are in each case electrically connected to an electronic control unit, not depicted in the drawing, and they can be controlled by this control unit to generate additional hydraulic resistance.

In addition, the hydraulic control 1 comprises the electrical movement sensors 12 provided on the movable components 91 and 92 for indirect or direct detection of these respective positions, which are in each case connected to the latter in order to transfer the detected sensor values to the control unit 14. In the control unit 14, on the one hand, at least one trajectory can be stored, and, on the other hand, a control mode can be activated, in which the priority valves 7 can be controlled using the values actually detected in each case by the electrical movement sensors 12 upon actuation of the joystick 15 by the control unit 14 in such a way that the stored trajectory is run by corresponding control of the drives 3.

Thus, in the case of the activation of the control mode, the priority valves 7 are actuated depending on the requirement for reaching the stored trajectory, so that either the hydraulic drive 3 with the higher load is prioritized over the hydraulic drive 3 with the lower load, or conversely, the hydraulic drive 3 with the lower load is prioritized over the hydraulic drive 3 with the higher load. Consequently, the drive 3 with the lower load is loaded with more resistance, so that it is in effect actuated less than it is actually preset by the operator of the construction machine by his actuation of the joystick.

Thus, it is possible to control the speed and position of the hydraulic drive 3 by the priority valves 7, since the latter change the respective hydraulic resistance in the hydraulic connections 4 and thus the hydraulic flow to the respective drives 3 is altered with respect to the specification of the joystick. Thus, in the case of an activated control mode with any actuation of the joystick, the trajectory stored in the control unit can be automatically travelled as long as the joystick continues to be actuated.

We claim:

1. A construction machine (100) with a hydraulic system with at least one hydraulic control (1), the construction machine (100) comprising multiple components (9) moveable at least relative to one another, the at least one hydraulic control (1) comprising:

at least one joystick (15);

at least one hydraulic pressure source (2);

two hydraulic drives (3) each connected to the at least one hydraulic pressure source (2) by a hydraulic connection (4);

at least two main control valves (6) provided in each of the hydraulic connections (4), each of the at least two main control valves (6) controllable by the at least one joystick;

at least one priority valve (7) being an electrically actuatable proportional valve assigned to one of the two hydraulic drives (3) and provided in the hydraulic connection (4) thereof;

an electronic control unit (14) electrically connected to the at least one priority valve (7); and electrical movement sensors (12) provided on the movable components (9) for indirect or direct detection of respective positions thereof, the electrical movement sensors (12) are in each case connected to the movable components (9) in order to transfer detected sensor values to the electronic control unit (14), wherein a pressure level of each of the two hydraulic drives (3) depends on a working point of one of the hydraulic drives (3) selected in each case, wherein each of the multiple components (9) is operatively connected to one of the hydraulic drives (3) for moving one of the multiple components (9), wherein the at least one priority valve (7) is controlled by the electronic control unit (14) to generate additional hydraulic resistance, wherein in addition, in the electronic control unit (14), on the one hand, at least one trajectory can be stored, and, on the other hand, a control mode can be activated, in which the at least one priority valve (7) can be controlled using the values actually detected in each case by the electrical movement sensors (12) upon actuation of the at least one joystick (15) by the electronic control unit (14) in such a way that the at least one stored trajectory is run by corresponding control of the hydraulic drives (3).

2. The construction machine (100) according to claim 1, comprising at least two hydraulic pressure sources (2), wherein each of the two hydraulic drives (3) is connected to each of the at least two pressure source (2) by one of the hydraulic connections (4) each, and wherein the at least two hydraulic pressure sources (2) have different pressure levels.

3. The construction machine (100) according to claim 1, wherein the at least one priority valve (7) in the corresponding hydraulic connection (4) or one of the priority valves (7) in each of the corresponding hydraulic connections (4) is/are arranged in each case between the corresponding at least one hydraulic pressure source (2) and the associated main control valve (6).

4. The construction machine (100) according to claim 1, wherein each of the at least two main control valves (6) is a hydraulically-controlled main control valve (6), and wherein the corresponding at least one joystick (15) provided for the at least one hydraulic control (1) is at least partially a hydraulic joystick, with which at least one of the at least two hydraulically-controlled main control valves (6) can be controlled.

5. The construction machine (100) according to claim 1, wherein at least one of the electrical movement sensors (12) is assigned to each hydraulic drive (3) for detecting movements of the relevant hydraulic drive (3).

6. The construction machine (100) according to claim 1, wherein in the case of at least one hydraulic control (1), at least one of the electrical movement sensors (12) is assigned to each of the hydraulic drives (3) for detecting movements of the relevant component that can be moved by the respective hydraulic drive (3).

7. The construction machine (100) according to claim 1, wherein the at least one of the electrical movement sensors (12) is designed for detecting the position of one of the movable components (9) of the construction machine (100) for the indirect or direct detection of the absolute position in space.

8. The construction machine (100) according to claim 1, wherein the at least one of the electrical movement sensors (12) for detecting the position of the at least one of the movable components (9) of the construction machine (100) is designed for detecting the relative position of one of the movable components (9) with reference to the construction machine (100) and/or another movable component of the construction machine (100).

9. The construction machine (100) according to claim 1, wherein in each case a pressure sensor (16) is connected to the electronic control unit (14) and is assigned to at least one of the hydraulic drives (3), and wherein the pressure sensor (16) detects a hydraulic pressure acting on the at least one of the hydraulic drives (3) and passes it on to the electronic control unit (14).

10. The construction machine (100) according to claim 1, wherein at least one of the at least two main control valves (6) is electrically-controlled, and wherein the at least one joystick (15) is designed as an at least partially electric joystick for controlling at least one of the at least two main control valves (6).

11. The construction machine (100) according to claim 1, wherein the hydraulic connection (4) is formed in a partial area between one of the at least two main control valves (6) and one of the two hydraulic drives (3) by two partial connections.

12. The construction machine (100) according to claim 1, wherein the construction machine is a hydraulic excavator (100) and comprises an undercarriage (10), a rotating superstructure (11) arranged thereon, and an extension arm (9) arranged to be able to pivot on the superstructure (11).

13. The construction machine (100) according to claim 12, wherein the extension arm (9) is an articulated arm with a first arm segment (91) arranged to be able to pivot on the superstructure (11) and with a second arm segment (92) arranged to be able to pivot on the first arm segment (91), wherein a bucket (13) is configured to pivot on the second arm segment (92).

14. The construction machine (100) according to claim 13, wherein the two hydraulic drives (3) are configured to produce maximum forces of different levels, and one of the hydraulic drives (3) with a higher maximum force is assigned to the first arm segment (91) for its pivoting, and wherein other of the hydraulic drives (3) with a lower maximum force is assigned to the second arm segment (92) for its pivoting relative to the first arm segment (91).

15. The construction machine (100) according to claim 1, wherein at least one of the two hydraulic drives (3) is designed as at least one hydraulic cylinder (5).

16. The construction machine (100) according to claim 1, wherein the control mode can be activated at least manually.

17. The construction machine (100) according to claim 1, wherein the detected sensor values are stored in the electronic control unit (14), in which the control mode is to be activated, and wherein an algorithm for evaluating the sensor values currently detected by the electrical movement sensors (12), and, in the event that they accordingly match the sensor values stored in the electronic control unit (14), and/or sensor value combination(s) and/or sensor value sequence(s), automatic activation of the control mode is integrated into the electronic control unit (14).

18. The construction machine (100) according to claim 17, wherein an automatic mode can be activated in the electronic control unit (14), in which automatic mode the algorithm for automatic activation of the control mode is active.

19. The construction machine (100) according to claim 1, wherein the at least one priority valve (7) in the corresponding hydraulic connection (4) is arranged in each case between the at least one hydraulic pressure source (2) and the associated one of the at least two main control valves (6).

* * * * *